Sept. 9, 1924.  1,507,821
F. G. FOLBERTH ET AL
VALVE FOR WINDSHIELD CLEANERS
Filed March 20, 1922
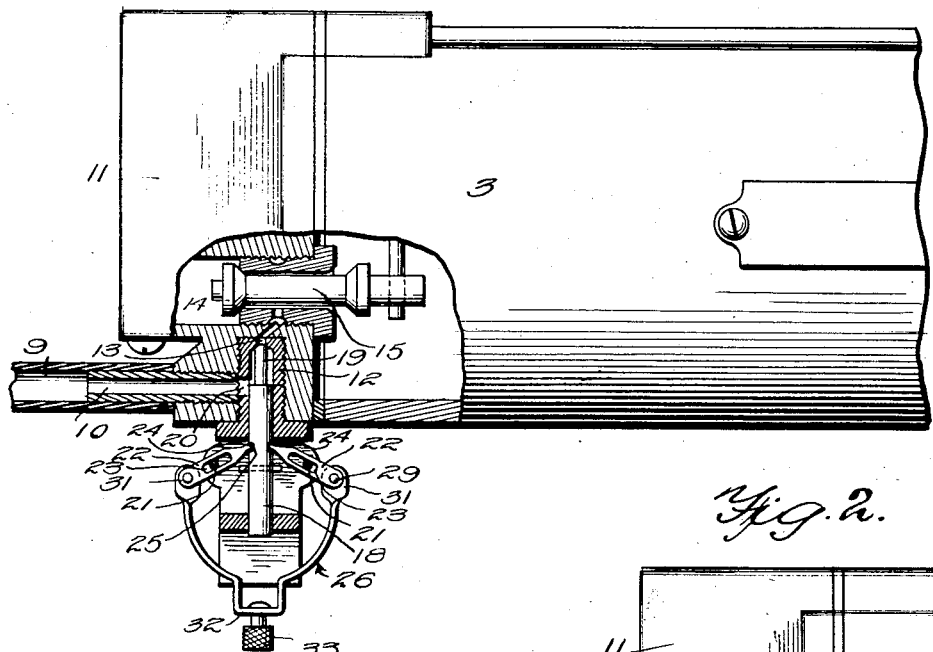
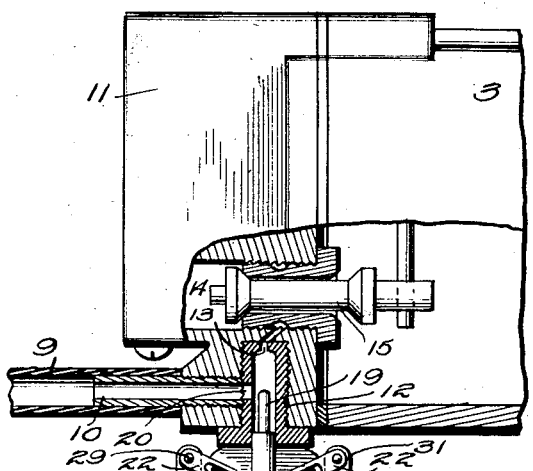
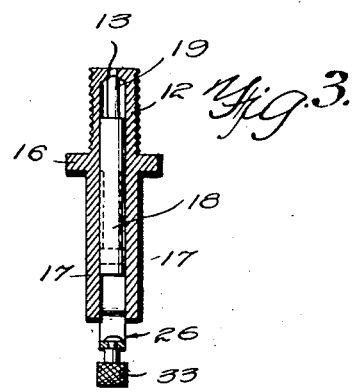
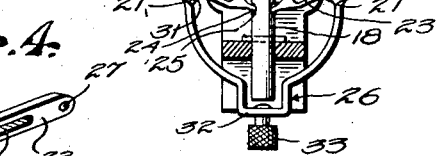
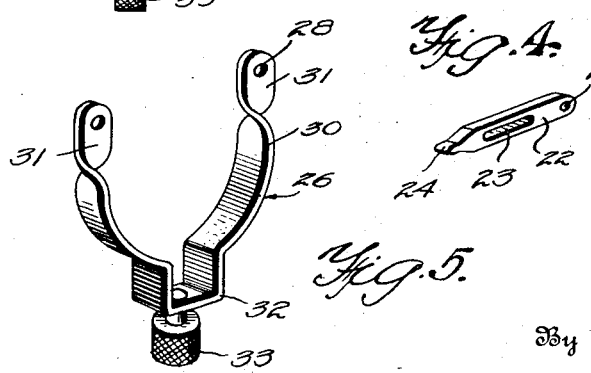
Inventors
Fred G. Folberth
William M. Folberth
By Ch. Parker
Attorney Patented Sept. 9, 1924.

1,507,821

UNITED STATES PATENT OFFICE.

FRED G. FOLBERTH AND WILLIAM M. FOLBERTH, OF CLEVELAND, OHIO, ASSIGNORS TO THE FOLBERTH AUTO SPECIALTY COMPANY, OF CLEVELAND, OHIO, A CORPORATION OF OHIO.

VALVE FOR WINDSHIELD CLEANERS.

Application filed March 20, 1922. Serial No. 545,150.

*To all whom it may concern:*

Be it known that we, FRED G. FOLBERTH and WILLIAM M. FOLBERTH, citizens of the United States, residing at Cleveland, in the county of Cuyahoga and State of Ohio, have invented certain new and useful Improvements in Valves for Windshield Cleaners, of which the following is a specification.

This invention relates to valves, and more particularly to valves for windshield cleaners.

An object of the invention is the provision of a valve arranged in the feed pipe which may be readily opened and closed.

In the present invention we provide a reciprocating valve and a pair of pivoted valve actuating members controlled by a spring.

An object of the invention is to provide a spring that will move the valve to opened or closed position after the pivoted valve actuating members pass a dead center.

In the accompanying drawings we have shown one embodiment of the invention. In this showing—

Figure 1 is a plan view of a portion of a windshield cleaner, parts being shown in section, showing the valve in closed position, Figure 2 is a similar view showing the valve in opened position, Figure 3 is a central sectional view through the valve and valve casing at right angles to Figure 1, Figure 4 is a detail view of one of the valve actuating members, and, Figure 5 is a perspective view of the spring.

Referring to the drawings, the reference numeral 3 designates a cylindrical motor casing of the type employed on automatic windshield cleaners, described and claimed in the patent to William M. Folberth, Reissue No. 15,502, granted December 5, 1922. The motor casing is provided with a suitable piston or actuating member and is further provided with automatic valves whereby either end of the cylinder may be connected to a suitable source of suction. As shown, the conduit 9 communicates with a tube 10 arranged in a head 11 on one end of the casing. This tube communicates with the interior of a valve casing 12 and the valve casing is provided with a port 13 communicating with a chamber 14 of the head. One type of automatic valve which may be employed is shown at 15.

The valve casing 12 is circular in form and is externally threaded and adapted to engage threads formed in a recess in the head 11. A circular flange 16 may be arranged on the exterior of the valve casing to limit its inward movement. Beyond the flange a pair of spaced side plates 17 are provided which form a guide for a valve stem 18. The inner end of the valve stem is provided with a needle valve 19 adapted to control the opening 13. As shown the valve casing is provided with an opening 20 arranged on one side and communicating with the inner end of tube 10. A pair of pins 21 are arranged between the plates 17 and a pair of valve actuating members 22 are arranged on these pins. As shown, the valve actuating members are provided with elongated slots 23 for the reception of the pins and their inner ends are pointed as at 24, adapted to be received in notches 25 formed on the valve stem. The outer ends of the valve actuating members are connected to a spring 26. As shown the ends of the valve actuating members are provided with openings 27 and the spring is provided with similar openings 28 adapted to receive pivot pins 29. The spring 26 is substantially semicircular comprising a main body portion 30 arranged at right angles to the ends 31. The central portion of the spring is off-set as at 32 forming a handle and a knob 33 may be secured thereto, if desired.

The operation of the device is as follows:

With the valve in the closed position shown in Figure 1 of the drawings, communication between the casing or cylinder and the conduit 9 is cut off by the engagement of needle valve 19 with the end of opening 13. In this position the actuating members 22 are arranged at an angle to the valve stem and the pressure of the spring tends to retain the valve in closed position. By pressing inwardly on the central portion of the spring the actuating members move and tend to assume a position at right angles to the valve stem. As the length of the portion of the valve actuating members between the stem and the pins 21 will decrease as the valve actuating members assume a position at right angles to the stem, the valve actuating members are provided with the elongated slots 23 which permit the inner ends of said members to move outwardly. As soon as the valve actuating members pass a position at right angles to the valve stem the pressure of the spring tends to move them to the position shown in Figure 4 of the drawings, opening the valve, and the pressure of the spring further holds the valve in opened position until the spring is moved outwardly. When the spring is moved outwardly a reverse action takes place and as soon as the valve actuating members pass a position at right angles to the valve stem the valve is immediately closed.

It will be apparent that the provision of valve actuating mechanism of the type disclosed permits quick opening and closing of the valve and is advantageous in that the valve is positively moved to opened and closed position by the action of the spring.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:

1. In a device of the character described, a valve casing, a reciprocating valve arranged therein, a valve stem connected to said valve, a pair of arms engaging said stem, said arms being provided with elongated slots, pins arranged in said slots to pivotally support said arms, the inner ends of said arms being arranged inwardly of said pins when the valve is in closed position and outwardly of said pins when the valve is in open position, and a substantially semi-circular spring connected to the outer ends of said arms to positively move said valve to open or closed position.

2. A device constructed in accordance with claim 1 wherein the intermediate portion of said spring is offset, forming a handle.

3. In a device of the character described, a valve casing, a valve stem arranged in said casing, a valve carried by said stem, a pair of pivoted members engaging said valve stem, and a substantially semi-circular spring connected to said members for exerting a pressure on said stem.

4. In a device of the character described, a valve casing, a reciprocating valve arranged in said casing, a valve stem secured to said valve, a pair of pivotally mounted arms engaging said valve stem, said arms being arranged at an acute angle to the valve stem when the valve is in open or closed position, and a substantially semi-circular spring connected to said arms to exert a pressure on said stem.

In testimony whereof we affix our signatures in presence of two witnesses.

FRED G. FOLBERTH.
WILLIAM M. FOLBERTH.

Witnesses:
MAXWELL F. FOURNIER,
HERMAN O. LEHR.